United States Patent
Beck et al.

(10) Patent No.: US 12,353,888 B2
(45) Date of Patent: Jul. 8, 2025

(54) MUSCLE/MEMORY WIRE LOCK OF DEVICE COMPONENT(S)

(71) Applicant: Lenovo (Singapore) Pte. Ltd., Singapore (SG)

(72) Inventors: Kevin W. Beck, Raleigh, NC (US); Robert James Norton, Jr., Raleigh, NC (US); Thorsten Stremlau, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 40 days.

(21) Appl. No.: 17/845,686

(22) Filed: Jun. 21, 2022

(65) Prior Publication Data

US 2023/0409339 A1 Dec. 21, 2023

(51) Int. Cl.
*G06F 9/4401* (2018.01)

(52) U.S. Cl.
CPC ................................. *G06F 9/4401* (2013.01)

(58) Field of Classification Search
None
See application file for complete search history.

(56) References Cited

U.S. PATENT DOCUMENTS

| | | | |
|---|---|---|---|
| 9,994,429 B1* | 6/2018 | Taniguchi | B66B 25/006 |
| 10,228,731 B2* | 3/2019 | Montero | G06F 1/1677 |
| 2004/0066713 A1* | 4/2004 | Liu | G11B 17/043 |
| 2005/0264472 A1* | 12/2005 | Rast | G09G 3/14 |
| | | | 345/30 |
| 2009/0190308 A1* | 7/2009 | Bhattacharya | F28F 13/12 |
| | | | 361/695 |
| 2013/0283349 A1* | 10/2013 | Liu | G06F 21/30 |
| | | | 726/3 |
| 2015/0082409 A1* | 3/2015 | Hogg | G06F 21/335 |
| | | | 726/9 |
| 2015/0143508 A1* | 5/2015 | Halibard | G06F 21/575 |
| | | | 726/19 |
| 2017/0109547 A1* | 4/2017 | Munns | E05B 47/0009 |
| 2021/0049310 A1* | 2/2021 | Grobelny | H04L 9/0825 |
| 2021/0326149 A1* | 10/2021 | Runyan | G06F 1/3218 |
| 2021/0335141 A1* | 10/2021 | Taylor | G07D 11/36 |

* cited by examiner

*Primary Examiner* — Paul Yen
(74) *Attorney, Agent, or Firm* — John M. Rogitz; John L. Rogitz (57) ABSTRACT

In one aspect, a device includes at least one processor and storage accessible to the at least one processor. The storage includes instructions executable by the at least one processor to execute a basic input/output system (BIOS) to apply voltage to muscle wire within the device (and/or apply heat to memory wire within the device). The wire locks a component of the device in place without voltage (or heat) being applied to the wire so that, responsive to the BIOS influencing the wire, the wire unlocks the component for removal from the device.

20 Claims, 7 Drawing Sheets

MUSCLE/MEMORY WIRE LOCK OF DEVICE COMPONENT(S)

FIELD

The disclosure below relates to technically inventive, non-routine solutions that are necessarily rooted in computer technology and that produce concrete technical improvements. In particular, the disclosure below relates to muscle/memory wire locks of device components.

BACKGROUND

As recognized herein, during the life of a computer system a certain part might need to be upgraded or repaired. However, the disclosure below recognizes that open and unfettered access to the internals of the computer system for quick and easy repairs is not always desirable because parts can be stolen, the computer system can be damaged in the process, and untracked changes to the configuration of the computer system can adversely affect the value and functioning of the system if parts are not replaced like-for-like. There are currently no adequate solutions to the foregoing computer-related, technological problems.

SUMMARY

Accordingly, in one aspect a first device includes at least one processor and storage accessible to the at least one processor. The storage includes instructions executable by the at least one processor to execute a basic input/output system (BIOS) to apply voltage to muscle wire within the first device. The muscle wire locks a component of the first device in place without voltage being applied to the muscle wire so that, responsive to the BIOS applying voltage to the muscle wire, the muscle wire unlocks the component for removal from the first device.

In certain example implementations, the instructions may be executable to authenticate a user and, based on authenticating the user, execute the BIOS to apply voltage to the muscle wire. Additionally, if desired the instructions may be executable specifically to execute the BIOS to apply voltage to the muscle wire based on authenticating the user and based on a subsequent user command to unlock the component.

Also in certain example implementations, the instructions may be executable to determine that the muscle wire has been broken. Based on determining that the muscle wire has been broken, the instructions may then be executable to indicate in a log that the muscle wire has been broken, and/or transmit a message to a second device that the muscle wire has been broken (where the second device may be different from the first device). For example, the instructions may be executable to determine that the muscle wire has been broken based identifying that resistance along at least a portion of the muscle wire is infinite.

Moreover, if desired voltage may be applied to the muscle wire at a first contact within the device, where the first contact may be potted within the first device using a potting agent. In certain examples, the first device may even include the first contact and the potting agent.

Additionally, in certain example embodiments the instructions may be executable to determine that a user has viewed a video on repairing the component, removing the component from the first device, and/or replacing the component in the first device. Based on the determination, the instructions may then be executable to execute the BIOS to apply voltage to the muscle wire. Additionally, in certain examples the instructions may also be executable to make the determination based on receipt of data provided by the user, such as a one-time password and/or a valid-one-time file. The data might also include data identifying the user.

Still further, note that in certain examples the first device itself may even include the component, the BIOS, and the muscle wire.

In another aspect, a method includes executing an operating system. The method also includes using the operating system to influence wire within a device. The wire locks a component of the device in place without the influence on the wire. The wire includes muscle wire and/or memory wire.

In certain examples, the operating system may be a basic input/output system (BIOS).

Also in certain examples, the method may include authenticating a user and, based on authenticating the user, executing the operating system to influence the wire.

Still further, in certain example implementations the method may include determining that a user has viewed a video on repairing the component, removing the component from the device, and/or replacing the component in the device. Based on the determining, the method may then include executing the operating system to influence the wire.

In still another aspect, an apparatus includes at least one computer readable storage medium (CRSM) that is not a transitory signal. The at least one computer readable storage medium includes instructions executable by at least one processor to execute an operating system to influence wire within a device, with the wire locking a component of the device in place without the influence on the wire.

Thus, in various examples the wire may include muscle wire influenced via voltage and/or memory wire influenced via heat.

Also in various examples, the operating system may be a basic input/output system (BIOS).

Still further, in certain examples the instructions may be executable to unlock the operating system via a decryption key and, responsive to unlocking the operating system via the decryption key, execute the operating system to influence the wire within the device.

The details of present principles, both as to their structure and operation, can best be understood in reference to the accompanying drawings, in which like reference numerals refer to like parts, and in which:

DETAILED DESCRIPTION

Among other things, the detailed description below discloses muscle wire-actuated and/or memory wire-actuated locks/pins to secure device components in place. The actuation of these locks/pins may be controlled from BIOS settings, subject to BIOS access control levels which would grant lock or unlock ability for someone to service/upgrade the component based on their access level. This could be configured by the end-user as a selective/elective choice in BIOS (e.g., tied to supervisor password) to allow all or some repairs/replacements.

Additionally, the wires may be tamper-evident in that the lock wires may be aware of their own state (via resistance monitoring) and report if tampered with.

Additionally, in the case of catastrophic failure of the device (e.g., if the motherboard is completely dead), then an authorized person could still clip the wire locks or access a protected master location/contact point for application of voltage/heat to the wire (e.g., a potted or encapsulated contact point where the potting would be broken open in order to apply voltage/heat).

Additionally, access to unlock the component may be given selectively via various authentication methods (e.g., either on-going, or on a one-time basis), such as smart card authentication, biometric authentication, etc.

As an example for selective, potentially one-time authentication, in some specific examples the device may require a technician or end-user to watch a video for the repair procedure they are seeking to perform before the device unlocks the associated component itself. Then after watching the video the user would be provided with a token, which may then be used to unlock the specific component itself. Thus, in requiring the person to watch the video, the device and/or device manufacturer is allowed/enabled to track technician proficiency, track the identity of the person who did the repairs or otherwise unlocked the component, track what specific components are currently in the system (e.g., track the delta to original bill of materials (BOM)), and verify changes to the device.

Note that present principles may also protect hot-swappable components, such as drives in workstations and servers.

Additionally, note that in some specific example embodiments, present principles may be implemented with fast identity online (FIDO) token linkage for in-house service technicians. E.g., master level can unlock/change any component, but user level can only access designated customer-replaceable units (CRUs) (e.g., as designated by the manufacturer). So, for example, only a technician with master-level privileges may be authorized to unlock/replace a motherboard, but a person with user-level privileges may be authorized to unlock/replace a memory card or built-in keyboard.

Present principles may also have asset recovery service (ARS) applicability (e.g., for devices that are leased to end-users and for devices the end-users are returning at the end of the devices' lives to sell or recycle various device parts). For example, when a device as a service (DaaS)-enrolled device is being returned by the end-user to the manufacturer, the end-user may lock access to the components via the memory and/or muscle wires before return to the manufacturer using a public key to protect the components while in transit. Then the manufacturer can unlock the wires with the reciprocal private key when the device is received from the end-user.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM, or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
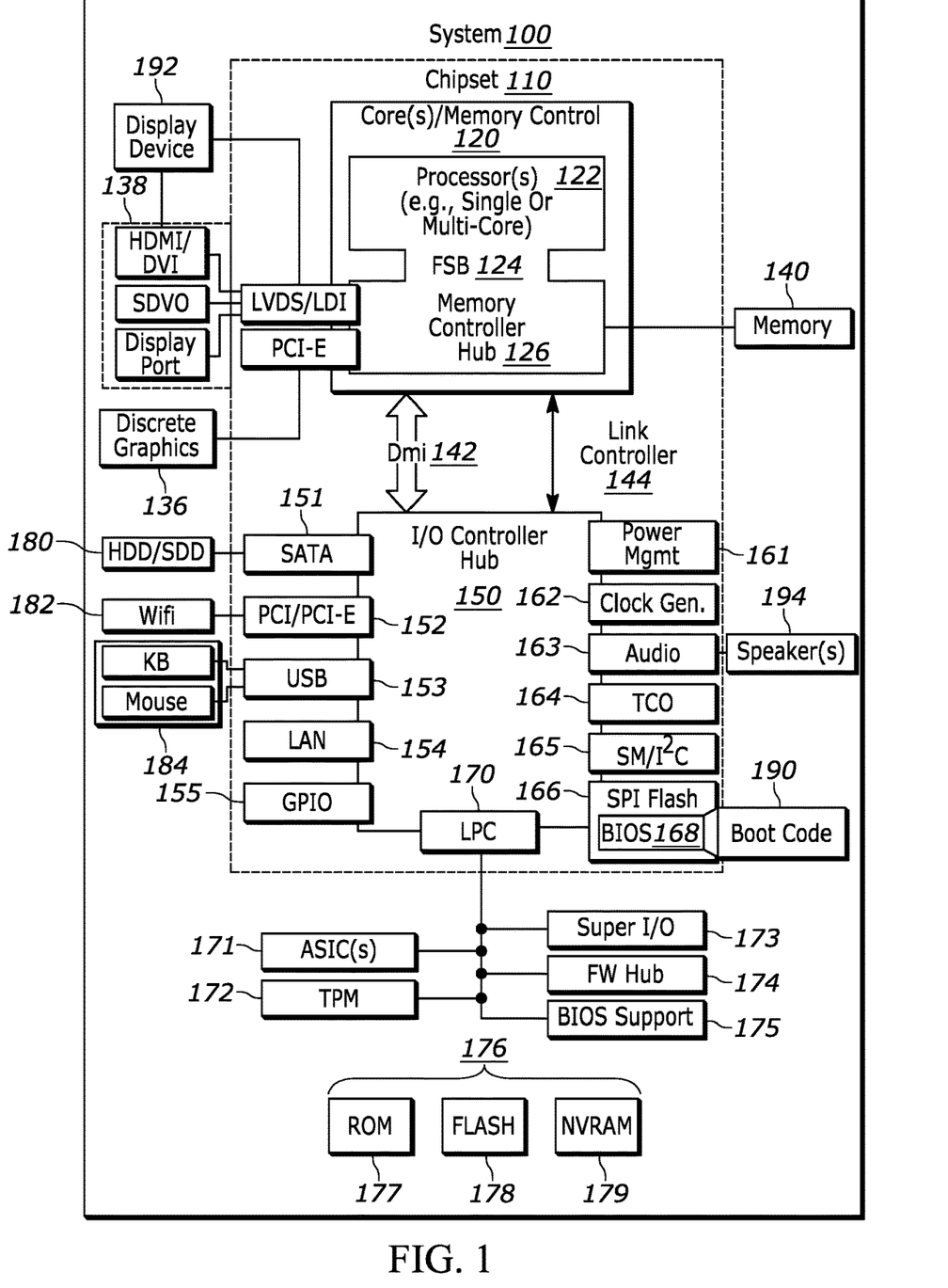
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Note that in some examples, BIOS may be a set of routines stored in read-only memory that enable a computer to start a (e.g., guest) operating system and to communicate with the various components in a system, such as disk drives, keyboards, displays/monitors, printers, communications ports, and others set forth herein. In one example embodiment, functions performed by BIOS may also be performed by other higher level software application programs. In another example embodiment, BIOS may be a Unified Extensible Firmware Interface (UEFI), which assists in control handoff of a computer system to an operating system during a pre-boot environment (e.g., after the computer system is powered on, but before the operating system starts).

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video. Also, the system 100 may include a global positioning system (GPS) transceiver that is configured to communicate with satellites to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
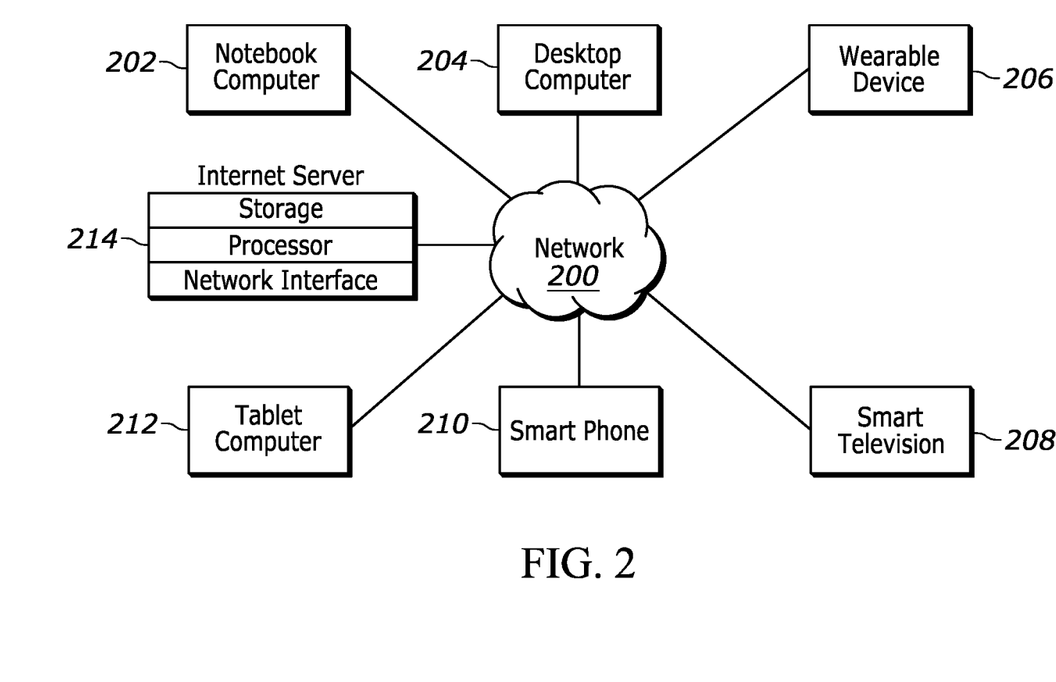
FIG. 2 is a block diagram of an example network of devices consistent with present principles.

Turning now to FIG. 2, example devices are shown communicating over a network 200 such as the Internet in accordance with present principles, such as to transmit notifications regarding broke muscle/memory wires as discussed further below. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
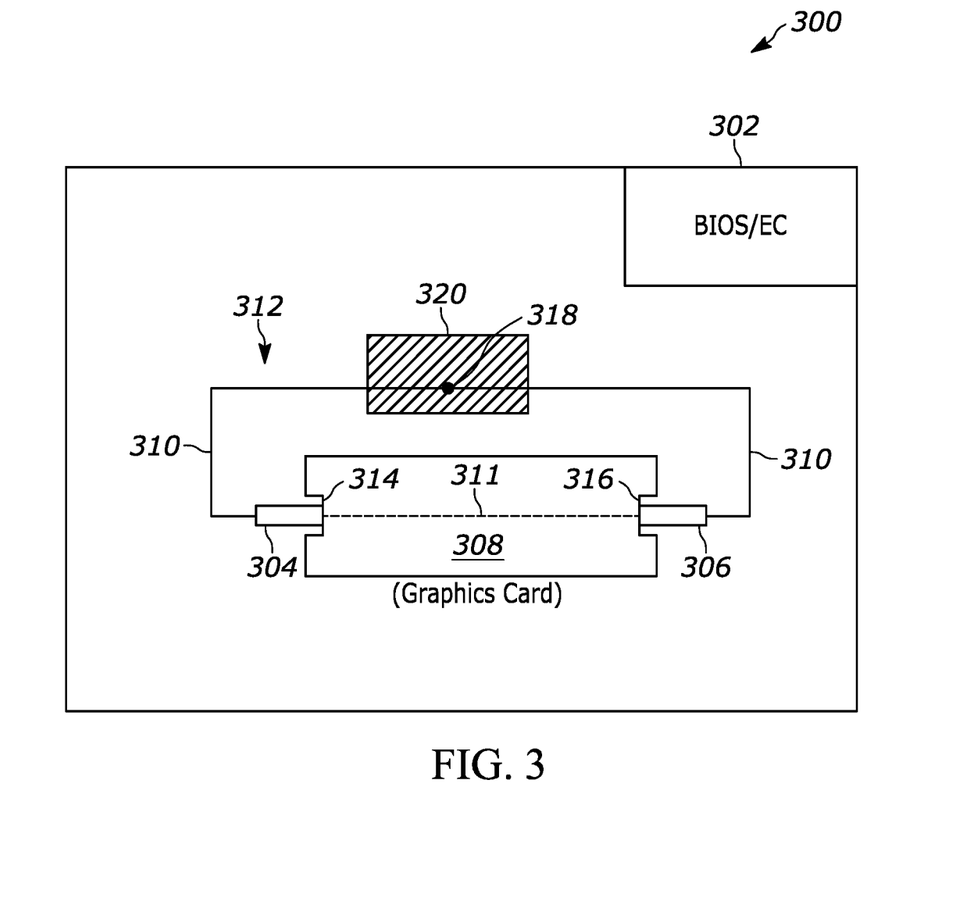
FIG. 3 is an example schematic diagram of a muscle/memory wire locking configuration with respect to a given internal component of a computing device.

Now in reference to FIG. 3, an example schematic diagram is shown of the internals of a device 300 such as a laptop computer, tablet computer, smartphone, wearable device, augmented reality (AR) or virtual reality (VR) headset, etc. As shown, the device 300 may include a basic input/output system (BIOS) and/or embedded controller (EC) (e.g., microprocessor) that are jointly represented by element 302.

Consistent with present principles, BIOS/EC 302 may receive a user command to apply voltage to muscle wire 304, 306 within the device 300 to influence the muscle wire 304, 306. Note that the muscle wire 304, 306 may lock a component 308 of the device 300 in place without voltage being applied to the muscle wire so that, responsive to the BIOS applying voltage to the muscle wire, the muscle wire contracts to unlock the component 308 for removal from the first device (and, likewise, with removal of the voltage, the muscle wire may expand to lock the component 308 into place).

In the present example, the component 308 is a graphics card, though other components within the device may also establish the component 308 including, but not limited to, memory (e.g., RAM), add-on cards, processors, hard drives, network transceivers/cards, etc. As also shown per this example, the muscle wires 304, 306 have been configured as pins that are connected to electrical lines 310 forming a circuit 312 (with part of the circuit 312 having an electrical line 311 extending through or integrated with the component 308 to connect the wires 304, 306 and complete the circuit 312 for an integrity check as will be described later). The muscle wire pins 304, 306 may protrude into respective openings 314, 316 in the component 308 that have been configured for closely receiving the pins 304, 306 to lock the component 308 in place within the device 300 (when not influenced by voltage) so that the component 308 cannot be removed as it otherwise normally would (e.g., by popping the component 308 out from its interference fit within the device 300). However, further note that the muscle wire 304, 306 may be adapted to other configurations besides pins as well, depending on desired implementation but still consistent with present principles.

For instance, muscle wire may run along a lip or indentation of the respective component and beyond it on both sides, while also being secured at each end to the device housing itself, to lock the component into place via the muscle wire until voltage is applied. As another example, the muscle wire could form part of spring-loaded pins or tabs that already secure a component into place within the device via interference fit (as might already be employed to prevent undue vibration of the component within the device), with the muscle wire then preventing removal of the component until voltage is applied (in addition to the pins or tabs otherwise securing the component within its appropriate spot in the device to prevent vibration). Or as yet another example, in addition to or in lieu of locking the respective component itself into place, the muscle wire may be configured so that, until voltage is applied, it may block the removal of an existing clip or other pin that secures the component itself into place within the device (e.g., into its socket), and/or may block an opening where a pull tab would be moved to remove the component itself.

Still in reference to FIG. 3 and further describing present principles, note that the muscle wire may be configured to contract under application of voltage to thus remove the proximal end portions of the wires 304, 306 from within the openings 314, 316 to thus permit the component 308 to be removed. The application of voltage may be controlled by the BIOS/EC 302. The voltage itself may be provided through an electrical contact 318 on the circuit 312 and within the device 300, with voltage to the contact 318 being controlled by the BIOS/EC 302 via an electrical switch along another line (not shown) from a battery in the device 300 to the contact 318 (or from another power source such as an AC adapter/power supply unit for the device 300).

As an added security measure to help ensure the component 308 is removable by authorized individuals but not unauthorized individuals (e.g., via authentication to BIOS 302 as will be explained further below), in certain specific example embodiments the contact 318 may be potted within the device 300 to seal the contact 318 from all sides. The contact 318 may be potted using a potting agent 320 like an epoxy, polyurethane, urethane, silicone, polyacrylate, or other suitable adhesive/material so that the contact 318 can only be destructively accessed by breaking/opening the potting agent. This can serve to indicate tampering (when, e.g., the device 300 is returned to its manufacturer at its end of life for parts harvesting and/or recycling), while also possibly destroying the contact 318 itself so a nefarious third party cannot apply external voltage to the contact 318 to remove the component 308. However, this configuration would still permit the manufacturer or other intended/authorized party to re-wire the circuit 312 at the end of the device's life (and/or upon catastrophic failure of the BIOS/EC 302) as a last resort to apply voltage to the muscle wires 304, 306 contract them away from the openings 314, 316 and harvest/recycle the component 308 anyway. Thus, this feature may establish a manufacturer bypass so the component 308 itself does not necessarily have to be destructively removed with the muscle wires 304, 306 in their expanded, locked state within the openings 314, 316 at the end of the device's life.

In any case, as stated above the BIOS/EC 302 can apply voltage via the contact 318 to contract the lengths of the wires/pins 304, 306 from inside the openings 314, 316 to permit the component 308 to be removed. In some examples, such as for hot-swapping of server components or hot-swapping personal computer components while the device remains powered on, the device 300 itself need not be powered off and as such BIOS may both authenticate the user as authorized to remove the component 308 and also apply the voltage itself. However, in other examples where the device 300 may have to be powered down/turned off for removing the component 308, BIOS may still authenticate the user (prior to the device 300 being powered down) and then send an authorization signal to the EC so that the EC itself can apply the voltage from the device's power source to unlock the component 308 since the EC may draw power directly from the device's power source even when other device components such as the CPU that controls the BIOS are powered off.

Figure 4:
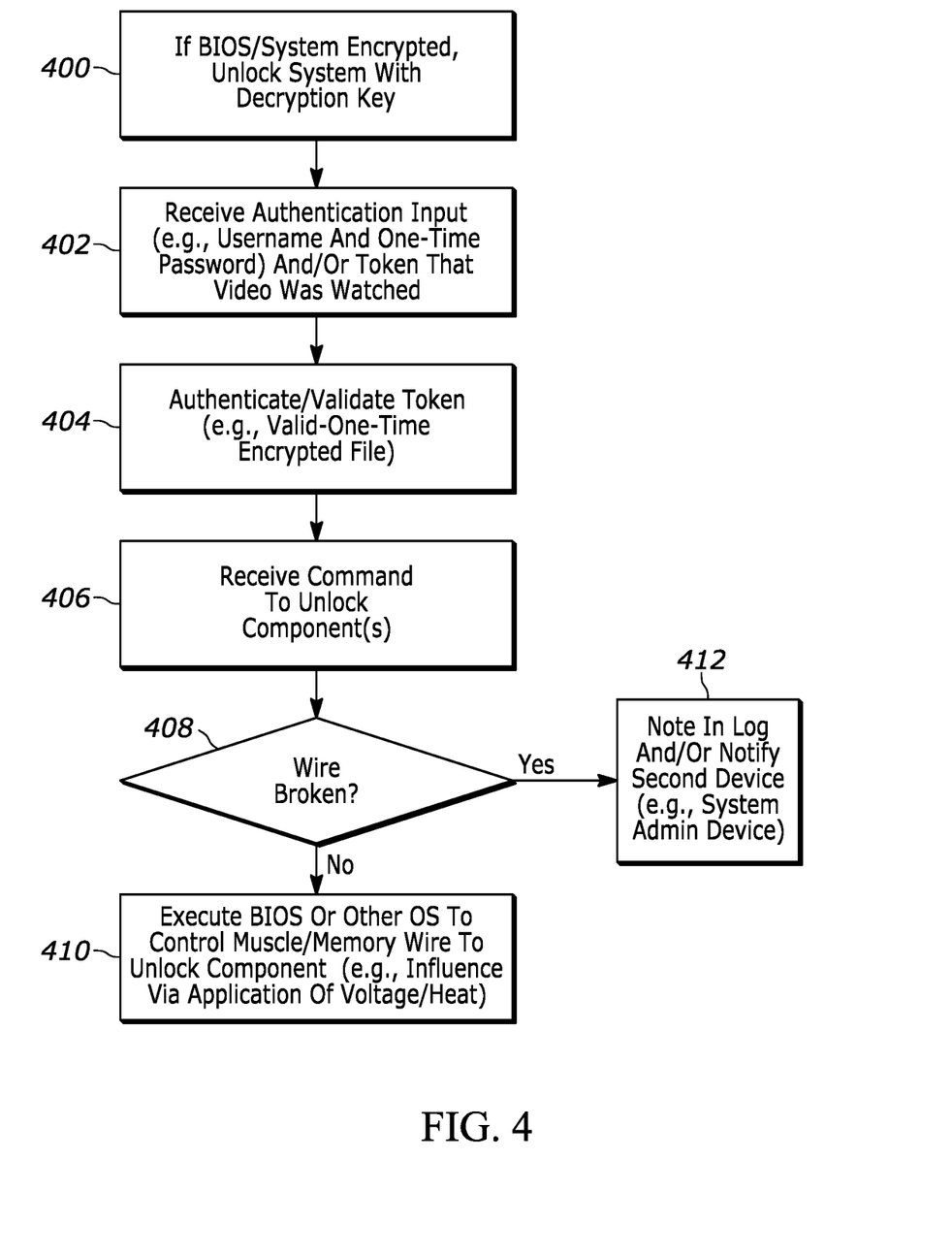
FIG. 4 illustrates example logic in example flow chart format that may be executed by a device consistent with present principles.

Before moving on to the description of FIG. 4, also note consistent with present principles that the muscle wire 304, 306 may be made of a suitable muscle wire material, such as a nickel-titanium alloy (e.g., Nitinol) with the two elements being present in roughly equal atomic percentages/equal parts.

Also before moving on to the description of FIG. 4, note consistent with present principles that in addition to or in lieu of using muscle wire, memory wire may be similarly used (e.g., shape-memory wire). Thus, here the BIOS/EC 302 would apply heat to the memory wire to contract it or otherwise configure it into a shape in which it is removed from the openings 314/316 to permit the component 308 to be disengaged from the device 300. Removal of the heat may then cause the memory wire to return back to its previous state/shape to lock the component 308 into place. In various examples, heat may be applied by the BIOS/EC 302 based on the application of voltage itself to the wire and/or contact 318 (since application of voltage can create heat). Additionally or alternatively, heat may be applied by running the heat from a heat source through a different line/component to the memory wire. For example, the BIOS/EC 302 may turn on a switch in a line running from the contact 318 (and/or memory wire itself) to the device's CPU or network interface card to harvest heat produced by either of those components, which in turn may influence the memory wire to unlock the component 308.

Referring now to FIG. 4, it shows example logic that may be executed by a device such as the system 100 in accordance with present principles (e.g., executed by the BIOS/EC 302 in particular, alone or in any appropriate combination). Note that while the logic of FIG. 4 is shown in flow chart format, other suitable logic may also be used.

Beginning at block 400, the device may unlock BIOS and/or the device itself with a decryption key, if the BIOS/device has been encrypted as will be explained later. From block 400 the logic may proceed to block 402.

At block 402 the device may receive authentication input from a user, such as input of a username (or other user identifier) and password (e.g., one-time password). The authentication input may additionally or alternatively include biometric input for biometric authentication (e.g., fingerprint authentication, voice ID authentication, facial recognition authentication, etc.). As another example, the authentication input may be established by insertion of a user-specific USB drive or smart card into a port of the device to authenticate the user. Other types of input/authentication may also be used.

Also at block 402, in some examples the device may receive a token indicating that a video on replacing the subject component has been watched. This aspect will also be described in greater detail later.

From block 402 the logic may then proceed to block 404. At block 404 the device may, responsive to receiving valid authentication input at block 402, authenticate the user as being authorized to remove any component of the device or the specific subject component. Additionally or alternatively but also at block 404, the device may validate the token that was received at block 402, such as validating that a one-time-use encrypted file is in fact valid by decrypting it using a reciprocal decryption key to which the device has access, and/or validating a digital signature or digital certificate that accompanies the file itself. Responsive to successful authentication and/or validation, the logic may then proceed to block 406.

At block 406 the device may receive a command to unlock the subject component(s), such as through input to a graphical user interface (GUI) like the GUIs 500 or 700 that will be described later. Also note that if the user has not already so-indicated, at block 406 the user may indicate the specific component to be unlocked along with providing the command itself. The logic may then proceed to decision diamond 408.

At diamond 408, prior to influencing muscle or memory wire as discussed above to unlock the subject component, the device may determine whether the wire has been broken (indicating that the component has been tampered with). To do so, the device may monitor or determine resistance along the wire and/or overall circuit itself as an integrity check (e.g., circuit 312 from above). If the device determines that resistance is infinity or at least greater than the known resistance of the wire when not broken, the device may determine that the wire has been broken/tampered with (thus implying that the associated component itself has been as well). If the device determines that resistance is at or close to the known resistance of the wire, the device may determine that the wire has not been broken.

Additionally or alternatively, for the integrity check the device may perform a continuity check where the device might try to send an electrical/communication signal across the relevant circuit (assuming the wire is in its expanded configuration to make an electrical connection(s) to complete the circuit, such as via the line 311 in the example described above). If the signal is successfully sent across the circuit (e.g., signal return is detected), the device may determine that the wire is not broken. But if the signal is not successfully sent across the circuit (e.g., return not received as expected) then the device may determine that the wire has been broken.

Thus, responsive to a negative determination at diamond 408 (the wire has not been broken), the logic may proceed to block 410 where the device may execute its BIOS (or control the EC or other operating system (OS) such as a guest OS) to influence the wire that is currently locking the subject component in place within the device in order to unlock the component as described herein. As a specific example, the component may be unlocked from the device's motherboard or an interior surface of the device's housing.

However, responsive to a negative determination at diamond 408 (the wire has been broken), the logic may instead proceed to block 412. At block 412 the device may note the identity of the wire that has been broken in a local (possibly encrypted) log/file stored at the device itself (such as a log accessible only to BIOS but not the device's guest OS like Windows or Linux). Additionally or alternatively, the device may notify another device via email or another type of message for further investigation by another person or the device manufacturer. Thus, the other device might be that of a system administrator or other security agent of the manufacturer, for instance. Accordingly, the steps taken at block 412 may act as a form of tamper alert if the muscle/memory wire were clipped or otherwise broken.

Figure 5:
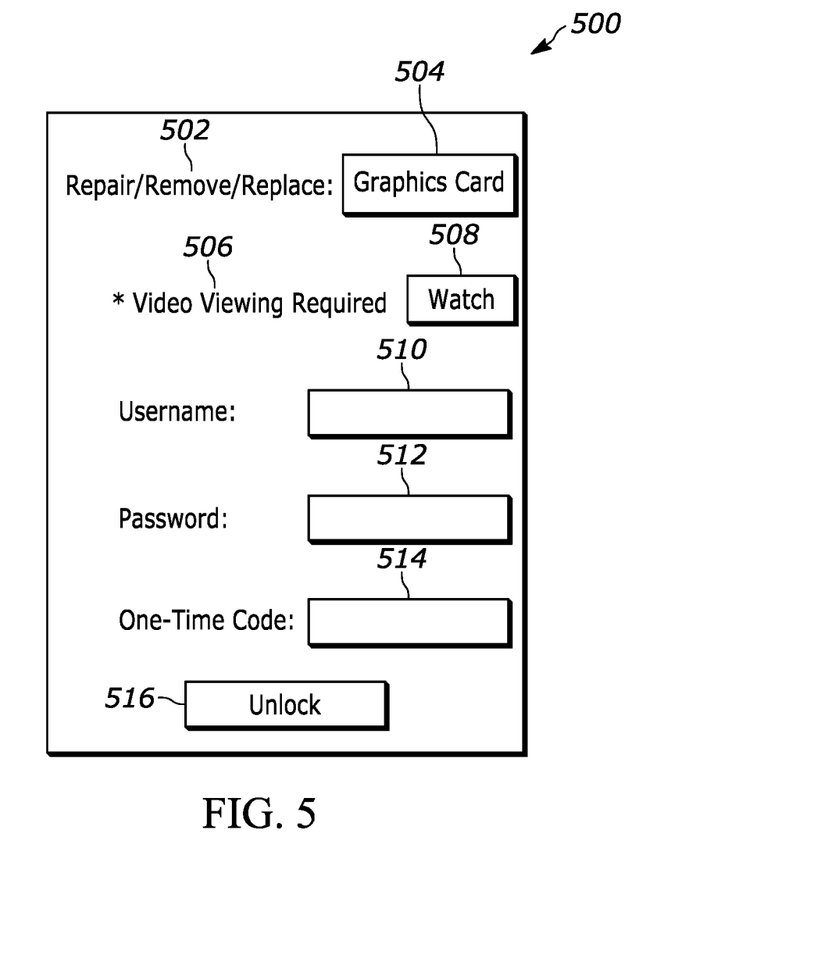
FIG. 5 shows an example graphical user interface (GUI) that may be presented on the display of the device for a user to authenticate to the device to unlock a given muscle/memory wire (or set of wires) for a particular component.

Continuing the detailed description in reference to FIG. 5, it shows an example GUI 500 that may be presented as a BIOS screen under control of the device's BIOS consistent with present principles. The GUI 500 may be presented upon user command to authenticate the user, user command to remove a specific component within the device itself, user command the power on the device, etc. For example, the GUI 500 may be presented for the user to provide authentication input and/or a token as received by the device at block 402 per the description above.

Accordingly, as shown in FIG. 5, the GUI 500 may include an option 502 at which the user may specify the specific device component that is to be unlocked. In the example shown, the user may do so by selecting from a drop down list represented by element 504 or by entering text specifying the component to a text entry box as also represented by element 504.

Once a specific component has been selected or specified, the GUI 500 may dynamically update to include an indication 506 if applicable. For instance, there may be certain components for which the device manufacturer requires a technician or end-user to watch a video on removal, repair, or replacement of the subject component before that person is allowed to do the removal, repair, or replacement itself (a single time via one-time access, or for repeated times in the future). This might be required by the device manufacturer to help ensure components are only removed, repaired, or replaced by authorized people who have the requisite knowledge to do so, and to help ensure that the component itself is not damaged.

Thus, in such a situation the user may select the selector 508 through touch, cursor, or other input to command the device to present the video (e.g., access the video over the Internet or access it from a pre-stored, local storage location within the device). Then responsive to the video being played to completion, the user may be provided with a one-time code or general-use code as a token. Note here that the code may be provided via email or as pop-up GUI over the video itself. Or the code may be provided as an image as part of the video (e.g., as a persistent last frame of the video).

Further note here that in some instances, the uniform resource locator (URL) for the video that is linked to the selector 508 (if an Internet video) may be a one-time-use URL, with the corresponding token/code being unique as associated with both the URL and the user to track when that user views the video to completion and gets the unique code for one-time authorization to unlock the associated component. Thus, the identity of the user and/or the token itself may be tracked to log a given unlocking for a specific repair, removal, or replacement that is performed.

However, further note here that if the technician/user seeking to unlock the component is a so-called master technician, in certain examples the manufacturer may not require such an individual to watch the video first and instead this person may simply skip ahead to latter portions of the GUI 500 which will be described shortly. Or the manufacturer might possibly provide one-time authorization to a non-master technician even without that person watching the video first, such as through an active directory or other identity/rights management system, and in such a case this user may also skip ahead without watching the video.

Accordingly, the user—whether a master technician or not—may direct input to the entry field 510 to enter a username or other user ID identifying themselves. The user may also direct input to the entry field 512 to enter a one-time or general-use password for the user, as well as direct input to the entry field 514 to enter the code/token provided responsive to the user watching the video (if applicable).

Once valid information has been entered into each field 510-514 (and/or assuming the user already has been granted access to unlock the component), the user may select the unlock selector 516 to provide a command to the device to unlock the component by influencing the relevant muscle wire (with voltage) and/or memory wire (via heat) as described herein. Thus, selection of the selector 516 may establish the command received at block 406 of FIG. 4 in certain example embodiments.

Figure 6:
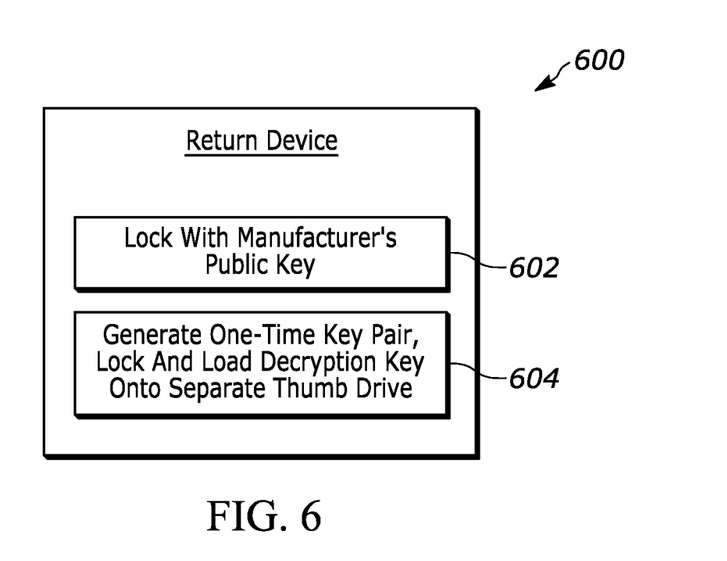
FIG. 6 shows an example GUI that may be presented to an end-user to lock various components with muscle/memory wire before returning the device to the device's manufacturer.

Before moving on to the description of FIG. 6, further note that in some examples, the token received for watching the repair/removal/replacement video described above may be a valid-one-time file, possibly encrypted for greater security, that may be generated and saved on a memory card, external USB storage, etc. and plugged into the device for unlocking the wire. So the file may be valid for only one use/unlocking. The file may indicate that the user watched the relevant video, indicate the ID of the user, and/or indicate authorization for that user to perform the repair/removal/replacement of the subject component itself. So, for example, responsive to the video playing to completion, the file may be autonomously saved to local storage of the device, and/or the user may be prompted save the file locally or to insert an external USB storage drive into the device to store the file there. However stored, the file may then be validated when the user goes to unlock the component itself.

Now in reference to FIG. 6, suppose at the end of a device's life, the end-user wishes to return the device to the device manufacturer for credit, recycling of parts, proper destruction of the hard drive so that data cannot be harvested therefrom, or other reasons. In such an instance, when the manufacturer receives the device back they may wish to ensure that the end-user sent the device back with all original components or authorized replacement components, and that someone else has not accessed the device in transit to harvest components without authorization (and possibly replace them with inferior or non-like-for-like components).

To accomplish this, the user may use the public key of a public/private encryption key pair to encrypt/lock the device, including encrypting/locking all storage/drives and all operating systems themselves (BIOS, guest OS, etc.) to in turn prevent the BIOS or other OS from unlocking the muscle/memory wires within the device for the various components while the device is in transit. The key pair may be a one-time use keypair, or may be a general-use key pair for the manufacturer themselves. If a general-use key pair is used, the device may access the manufacturer's public key over the Internet. If a one-time use key pair is to be used, the end-user's own device may generate the key pair, the one-time public key may be used for the encrypting/locking, and the one-time private key may be loaded onto external storage such as a USB storage drive plugged into the device's USB port. The device itself and the storage drive may then be shipped back to the manufacturer separately to ensure better protection of the one-time private key.

Then when the device (and possibly separate USB drive) reach the manufacturer, the manufacturer can unlock the device's muscle/memory wire-secured component(s) non-destructively using the private key to then access the associated component(s) themselves. It may thus be appreciated that the foregoing can help prevent component theft while the device is in transit.

With the foregoing backdrop, the GUI 600 of FIG. 6 shows that an end-user may initiate the process above by selecting either of the selectors 602, 604 when the GUI 600 is presented on the device's display. Selector 602 may be selectable to command the device to encrypt/lock the device using the manufacturer's general-purpose public key. Selector 604 may be selectable to command the device to instead generate a one-time use key pair and encrypt/lock the device with the encryption key (e.g., public key) from that key pair and also load the decryption key (e.g., private key) from that key pair onto a separate external storage drive/device (e.g., when prompted at a later time).

Figure 7:
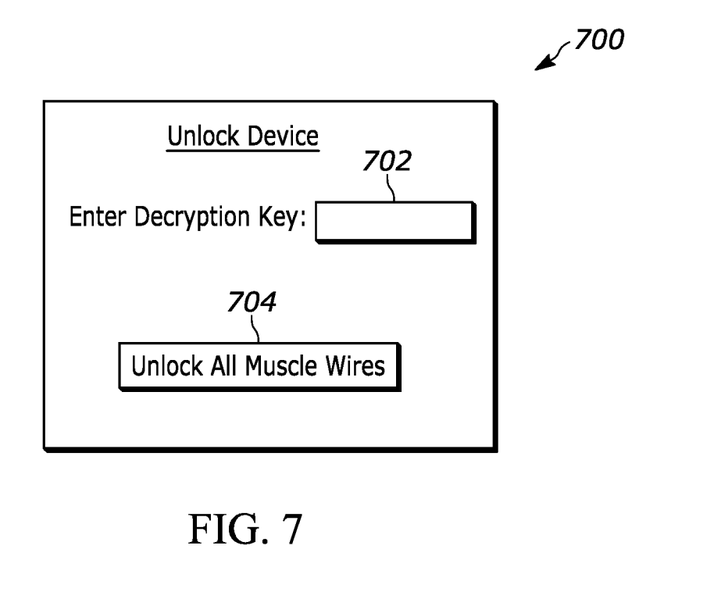
FIG. 7 shows an example GUI that may be presented on the display of the device responsive to power on of the device after receipt by the manufacturer.

The GUI 700 of FIG. 7 illustrates another GUI that may be presented on the display of the device as the first screen the next time anyone selects the power button for the device (assuming the device was powered off for transit). Thus, when the manufacturer receives the device and selects the power button, they may be presented with the GUI 700 to enter the decryption key into the input field 702, whether that is their own general-purpose private key or the one-time decryption key. Assuming a valid decryption key is entered, the manufacturer may then select the unlock selector 704 to provide a command to the device to unlock all muscle/memory wires of the device per the description herein. Thus, selection of the selector 706 may also establish the command received at block 406 of FIG. 4 in certain example embodiments.

Figure 8:
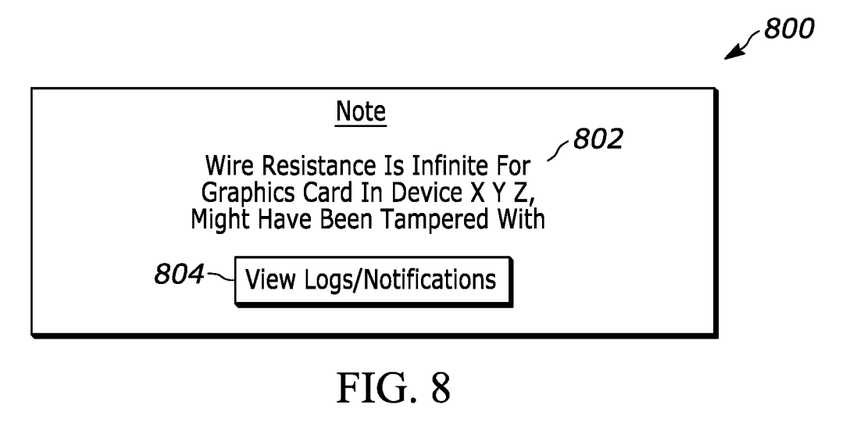
FIG. 8 shows an example notification GUI that certain muscle/memory wire has been broken.

Continuing the detailed description in reference to FIG. 8, another GUI 800 is shown. The GUI 800 may be presented on the display of another device that is associated with a system administrator or manufacturer of the wire/lock-bearing device. For instance, the GUI 800 may be presented as a notification (e.g., email) based on execution of block 412 as described above.

As shown in FIG. 8, the GUI 800 may include an indication 802 that resistance of muscle/memory wire locking a given component of the end-user's device (a graphics card in this example) has been detected as infinite. The indication 802 may also identify the specific end-user device by serial number, MAC address, or other identifying information (generally shown as "XYZ" in FIG. 8), as well as indicate that the device itself may have been tampered with or compromised in an unauthorized manner. If desired, the manufacturer may then select selector 804 to view wire unlock logs for the device and/or other notifications and logs related to the muscle/memory wires of the device.

Figure 9:
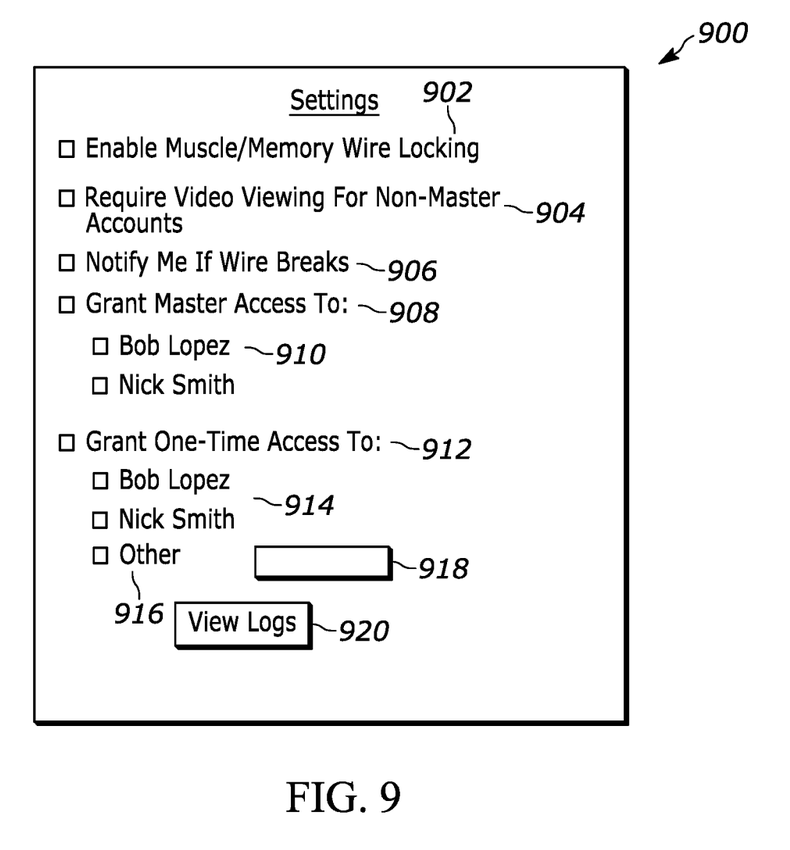
FIG. 9 shows an example GUI that may be presented to configure one or more settings of the device to operate consistent with present principles.

Now in reference to FIG. 9, an example GUI 900 is shown that may be presented on the display of a device configured to undertake present principles to configure or enable one or more settings of that device to operate as described herein (e.g., influence muscle or memory wire). The GUI 900 may be presented, for example, by navigating an app menu or a settings menu of the device or operating system. Also note that in the example shown, each option discussed below may be selected by directing touch or cursor input to the respective check box adjacent to the respective option.

As shown in FIG. 9, the GUI 900 may include an option 902 that may be selectable a single time via touch or cursor input to the adjacent check box to set or enable the device to undertake present principles for multiple future instances. For instance, selection of the option 902 may configure the device to execute the logic of FIG. 4, specifically authenticate users before unlocking muscle or memory wire, etc.

The GUI 900 may also include an option 904 to require certain users like non-master technicians to watch audio/video content (e.g., the videos described above) for removing, repairing, and/or replacing a given component before actually doing so. As also shown in FIG. 9, the GUI 900 may include an option 906 that may be selectable to specifically set or enable the device to provide notifications to the user and/or others if a muscle or memory wire is broken (e.g., if someone intentionally cuts it).

FIG. 9 further shows that the GUI 900 may include a section 908 listing various options 910 associated with respective people for which master access may be granted to unlock muscle wire based on authentication of those people (e.g., not just one-time access, and without watching a video first). Thus, selection of one or more of the options 910 for the various people may be used to alter the relevant active directory to reflect that general access permissions have been granted to the selected people to unlock muscle and memory wires for component repair, removal, and/or replacement.

In some examples, the GUI 900 may also include a section 912 listing various options 914 associated with respective people for which one-time access may be granted to unlock muscle/memory wire based on authentication of those people (e.g., also without watching a video first). Thus, selection of one or more of the options 914 for the various people may be used to alter the relevant active directory to reflect that one-time access permissions have been granted to the selected people to unlock muscle and memory wires for component repair, removal, and/or replacement. In some examples, an "other" option 916 may also be selected for the user to then enter another name into input field 918 to grant one-time access to that person (e.g., a new person not already in the active directory and for which a new active directory profile with corresponding permissions will then be created). Also note that though not shown, the section 908 may include a similar option and input field for granting permissions and creating new active directory profiles for master-technician level people.

Additionally, if desired in some embodiments the GUI 900 may also include a selector 920. The selector 920 may be selectable to command the device to present access logs such as those described above (e.g., logs for whom unlocked a certain muscle or memory wire or set of wires of the device, the identity of the associated component itself, whether a certain wire or set or wires were determined to have been broken, etc.).

Moving on from FIG. 9, another example implementation will now be discussed. Specifically, with the understanding that memory wire can change shape under the influence of heat, in some examples a given component may have at least two different memory wires engaged therewith. The first memory wire may lock the component in place as set forth above. However, the second memory wire may be positioned at another location, such as between the component and the surface to which it is mounted, so that heat may be applied to the second wire concurrently with heat being applied to the first wire (or at a relatively short threshold time thereafter, such as half a second) to pop or otherwise force the component out of its secured position within the device to make the component even easier for the user to remove. For example, the second memory wire may have shape-memory to remain straight without the application of heat, but to bend outward toward the component under application of heat to force the component out of its socket or other secured position.

It may now be appreciated that present principles provide for an improved computer-based user interface that increases the functionality and ease of use of the devices disclosed herein while also fostering greater security and component integrity. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. A first device, comprising:
   at least one processor; and
   storage accessible to the at least one processor and comprising instructions executable by the at least one processor to:
   apply heat to a memory wire, the memory wire locking a component of the first device in place without heat being applied to the memory wire by the first device so that, responsive to the first device applying heat to the memory wire, the memory wire unlocks the component for removal of the component from the first device;
   wherein the memory wire unlocks the component for removal of the component from the first device through movement of the component other than rotational movement to force the component out of a first position within the first device and into a second position within the first device, the first position being within a socket for the component and the second position not being within the socket for the component, wherein the memory wire has shape-memory to remain straight without application of heat but to bend toward the component under application of heat to force the component out from an interference fit within the socket.

2. The first device of claim 1, wherein the instructions are executable to:
   authenticate a user; and
   based on authenticating the user, apply heat to the memory wire.

3. The first device of claim 2, wherein the instructions are executable to:
   based on authenticating the user and based on a subsequent user command to unlock the component, apply heat to the memory wire.

4. The first device of claim 1, wherein the instructions are executable to:
   determine that the memory wire has been broken; and
   based on determining that the memory wire has been broken, indicate in a log that the memory wire has been broken.

5. The first device of claim 4, wherein the instructions are executable to:
   determine that the memory wire has been broken based on identifying that resistance along at least a portion of the memory wire is infinite.

6. The first device of claim 1, wherein the instructions are executable to:

determine that a user has viewed a video on one or more of: repairing the component, removing the component from the first device, replacing the component in the first device; and based on the determination, apply heat to the memory wire.

7. The first device of claim 6, wherein the instructions are executable to:

make the determination based on receipt of data provided by the user.

8. The first device of claim 1, comprising the memory wire.

9. A method, comprising:

executing an operating system; and using the operating system to thermally influence a wire within a device to force a component of the device, via movement other than rotational movement, out of a first position on the device and into a second position on the device, the first position being within a socket for the component and the second position not being within the socket for the component, the wire locking the component in the first position without the thermal influence on the wire by the device, wherein the wire has shape-memory to remain straight without application of heat but to bend toward the component under application of heat to force the component out from an interference fit within the socket.

10. The method of claim 9, comprising:

determining that a user has viewed a video on one or more of: repairing the component, removing the component from the device, replacing the component in the device; and based on the determining, executing the operating system to thermally influence to the wire.

11. The method of claim 9, comprising:

authenticating a user; and based on authenticating the user, thermally influencing the wire.

12. The method of claim 11, comprising:

based on authenticating the user and based on receiving a subsequent user command to unlock the component, thermally influencing the wire.

13. The method of claim 9, wherein the wire comprises memory wire.

14. An apparatus, comprising:

at least one computer readable storage medium (CRSM) that is not a transitory signal, the at least one computer readable storage medium comprising instructions executable by at least one processor to:

thermally influence a wire within a device to unlock a component of the device, the wire locking the component in place in the device without thermal influence on the wire by the device, wherein the wire unlocks the component under thermal influence by the device to force the component, via movement of the component other than rotational movement, out of a first position on the device and into a second position on the device, the first position being within a socket for the component and the second position not being within the socket for the component, wherein the wire has shape-memory to remain straight without application of heat but to bend toward the component under application of heat to force the component out from an interference fit within the socket.

15. The apparatus of claim 14, wherein the wire comprises memory wire.

16. The apparatus of claim 14, comprising the wire.

17. The apparatus of claim 16, comprising the at least one processor.

18. The apparatus of claim 14, comprising the at least one processor.

19. The apparatus of claim 14, wherein the instructions are executable to:

authenticate a user; and based on authentication of the user, thermally influence the wire.

20. The apparatus of claim 19, wherein the instructions are executable to:

based on authenticating the user and based on receiving a subsequent user command to unlock the component, thermally influence the wire.

* * * * *